US012006010B1

(12) United States Patent
Gibbons

(10) Patent No.: US 12,006,010 B1
(45) Date of Patent: Jun. 11, 2024

(54) ARTICULATABLE SUPPORT EYE CAPTURE KNUCKLE ASSEMBLY

(71) Applicant: G.F. Equipment, LLC, Bismarck, ND (US)

(72) Inventor: Robert R. Gibbons, Bismarck, ND (US)

( * ) Notice: Subject to any disclaimer, the term of this patent is extended or adjusted under 35 U.S.C. 154(b) by 0 days.

(21) Appl. No.: 18/169,782

(22) Filed: Feb. 15, 2023

(51) Int. Cl.
*B63C 5/02* (2006.01)
*B66F 3/36* (2006.01)

(52) U.S. Cl.
CPC . *B63C 5/02* (2013.01); *B66F 3/36* (2013.01)

(58) Field of Classification Search
CPC ........... B63C 5/02; B66F 3/36; B25B 27/062; B60D 1/02; B60D 1/167
See application file for complete search history.

(56) References Cited

U.S. PATENT DOCUMENTS 2,997,292 A 8/1961 Lucker et al.
4,711,461 A * 12/1987 Fromberg ................ B60D 1/02 403/57
5,051,056 A 9/1991 Gibbons et al.
5,186,483 A * 2/1993 Sheppard ................ B60D 1/07 280/492
5,516,140 A * 5/1996 Hinte ................... B60D 1/1675 280/491.1
5,765,851 A * 6/1998 Parent .................... B60D 1/167 280/491.4
6,514,061 B1 2/2003 Hudson
6,595,540 B1 * 7/2003 MacKarvich ............ B60D 1/54 280/498
6,764,092 B1 * 7/2004 Greaves, Jr. ............. B60D 3/00 280/402
6,981,306 B1 1/2006 Clouser
7,581,506 B2 * 9/2009 Whitney ................. B63B 34/26 114/249
7,909,350 B1 * 3/2011 Landry .................. B60D 1/155 280/491.1
8,118,323 B2 * 2/2012 Hudson ..................... B60D 1/28 280/504
8,567,807 B2 * 10/2013 Su ............................ B60D 1/54 280/491.1
8,925,955 B2 * 1/2015 Dekarske ................ B60D 1/44 280/491.3
9,457,631 B1 * 10/2016 Kennemer ............... B60D 1/52

* cited by examiner

*Primary Examiner* — Seahee Hong
(74) *Attorney, Agent, or Firm* — Fargo Patent & Business Law; Thomas Kading

(57) ABSTRACT

An articulatable support eye capture knuckle assembly for attachment to a support eye includes an attachment knuckle with a first arm and a second arm, a retention aperture in the first arm and the second arm along a retention axis, an attachment aperture along an attachment axis and an adjustment passage along an adjustment axis transverse to the attachment axis; a support eye retainer with an arcuate channel to receive a portion of a support eye; a support eye retainer plate fastened to the support eye retainer along a pivot axis, the support eye retainer plate pivotable about the pivot axis to at least partially enclose the arcuate channel; and a fastener mounted through a support eye retainer aperture and a support eye retainer plate aperture along the retention axis to secure the support eye retainer plate to the support eye retainer between the first arm and the second arm.

13 Claims, 13 Drawing Sheets

FIG. 4A
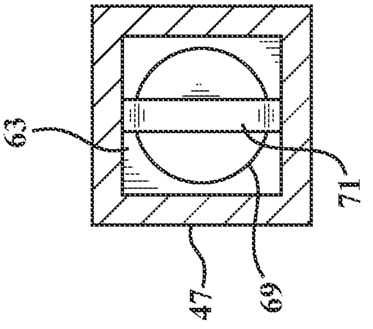
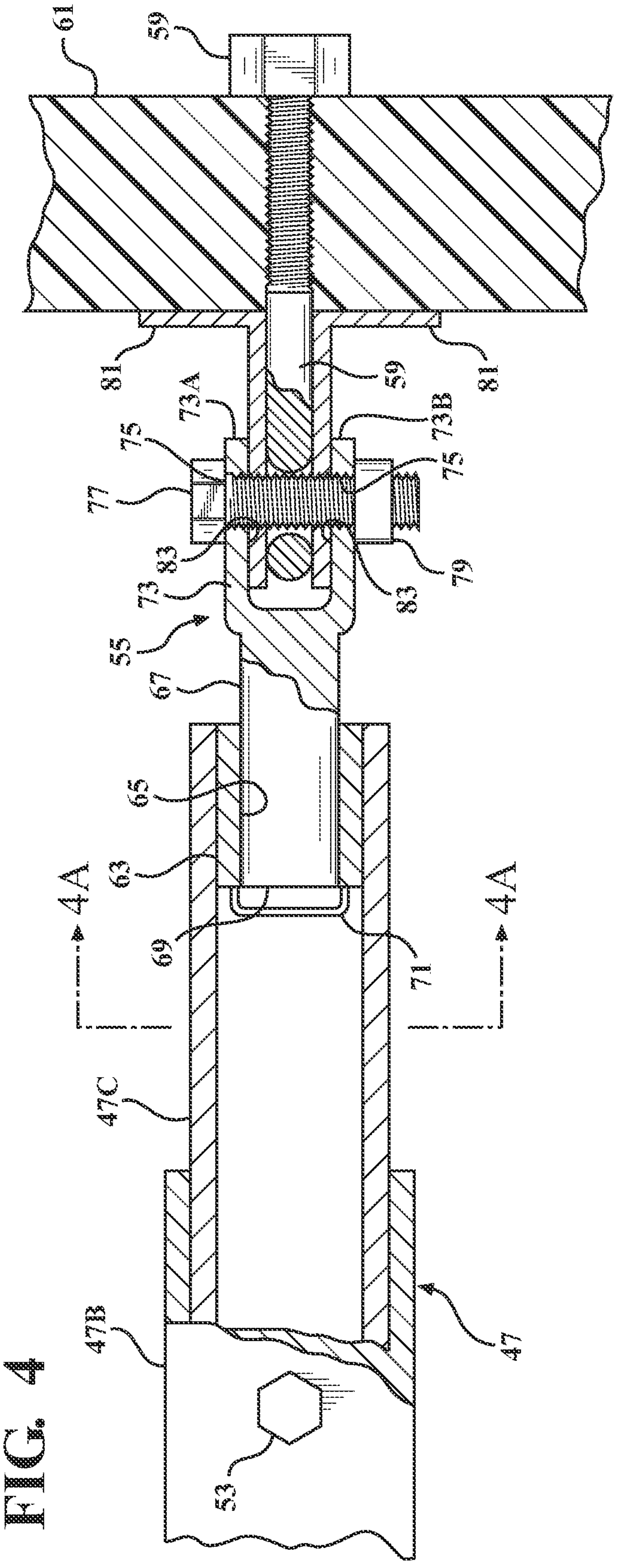
FIG. 4

ARTICULATABLE SUPPORT EYE CAPTURE KNUCKLE ASSEMBLY

BACKGROUND

The present disclosure relates to a fixture that interfaces with a support eye, and more specifically to an articulatable interface that captures and supports the support eye irrespective of the orientation thereof.

Portable jacking and rotating apparatus are utilized to suspend and rotate a vehicle such as a watercraft about its longitudinal axis without obstructing or covering portions of the watercraft. However, the interface between the boat support eye and the portable jacking and rotating apparatus have proved difficult to adequately configure.

SUMMARY

An articulatable support eye capture knuckle assembly for attachment to a support eye according to one disclosed non-limiting embodiment of the present disclosure includes an attachment knuckle with a first arm and a second arm, the second arm parallel to the first arm, a retention aperture in the first arm and the second arm along a retention axis, an attachment aperture along an attachment axis and an adjustment passage along an adjustment axis transverse to the attachment axis; a support eye retainer with an arcuate channel to receive a portion of a support eye; a support eye retainer plate fastened to the support eye retainer along a pivot axis, the support eye retainer plate pivotable about the pivot axis to at least partially enclose the arcuate channel; and a fastener mounted through a support eye retainer aperture and a support eye retainer plate aperture along the retention axis to secure the support eye retainer plate to the support eye retainer between the first arm and the second arm.

A further embodiment of any of the foregoing embodiments of the present disclosure includes a web attached to the first arm and the second arm, the attachment aperture and the adjustment passage though the web.

A further embodiment of any of the foregoing embodiments of the present disclosure includes a slot in the web, the slot parallel to the attachment aperture.

A further embodiment of any of the foregoing embodiments of the present disclosure includes that the adjustment passage along the adjustment axis passes through the slot.

A further embodiment of any of the foregoing embodiments of the present disclosure includes an adjustment assembly along the adjustment axis.

A further embodiment of any of the foregoing embodiments of the present disclosure includes that the adjustment assembly comprises a threaded stud within the slot, a threaded rod threaded through the threaded stud along the adjustment axis.

A further embodiment of any of the foregoing embodiments of the present disclosure includes a first nut and a first washer on a first end section of the threaded rod and a second nut and a second washer on a second end section of the threaded rod.

A further embodiment of any of the foregoing embodiments of the present disclosure includes that the first nut and the first washer and the second nut and the second washer are engaged with a first arm and a second arm of a U-bracket.

A further embodiment of any of the foregoing embodiments of the present disclosure includes that adjustment of the first nut and the first washer and the second nut and the second washer along the threaded rod adjusts an angle of the attachment knuckle with respect to the clevis.

An articulatable support eye capture knuckle assembly for attachment to a support eye according to one disclosed non-limiting embodiment of the present disclosure includes an attachment knuckle with a first arm and a second arm, the second arm parallel to the first arm, a retention aperture in the first arm and the second arm along a retention axis, an attachment aperture along an attachment axis and an adjustment passage along an adjustment axis transverse to the attachment axis, a slot in the web, the slot parallel to the attachment aperture, the adjustment passage along the adjustment axis passing through the slot; a support eye retainer with an arcuate channel to receive a portion of a support eye; a support eye retainer plate mountable to the support eye retainer to at least partially enclose the arcuate channel; a fastener mounted through a support eye retainer aperture and a support eye retainer plate aperture along the retention axis to secure the support eye retainer plate to the support eye retainer between the first arm and the second arm; and an adjustment assembly along the adjustment axis, the adjustment assembly comprises a threaded stud within the slot, a threaded rod threaded through the threaded stud along the adjustment axis.

A further embodiment of any of the foregoing embodiments of the present disclosure includes a first nut and a first washer on a first end section of the threaded rod and a second nut and a second washer on a second end section of the threaded rod.

A further embodiment of any of the foregoing embodiments of the present disclosure includes that the first nut and the first washer and the second nut and the second washer are engaged with a first clevis arm and a second clevis arm of a clevis.

A further embodiment of any of the foregoing embodiments of the present disclosure includes that adjustment of the first nut and the first washer and the second nut and the second washer along the threaded rod adjusts an angle of the attachment knuckle with respect to the clevis.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 4 is a fragmentary sectional side elevation of one of the rear-end connecting arms of the rear support frame of the new Boat Rotative Mount.

FIG. 4A is a sectional view of the connecting arm shown in FIG. 4, taken along lines 4A-4A.

DETAILED DESCRIPTION

Figure 1:
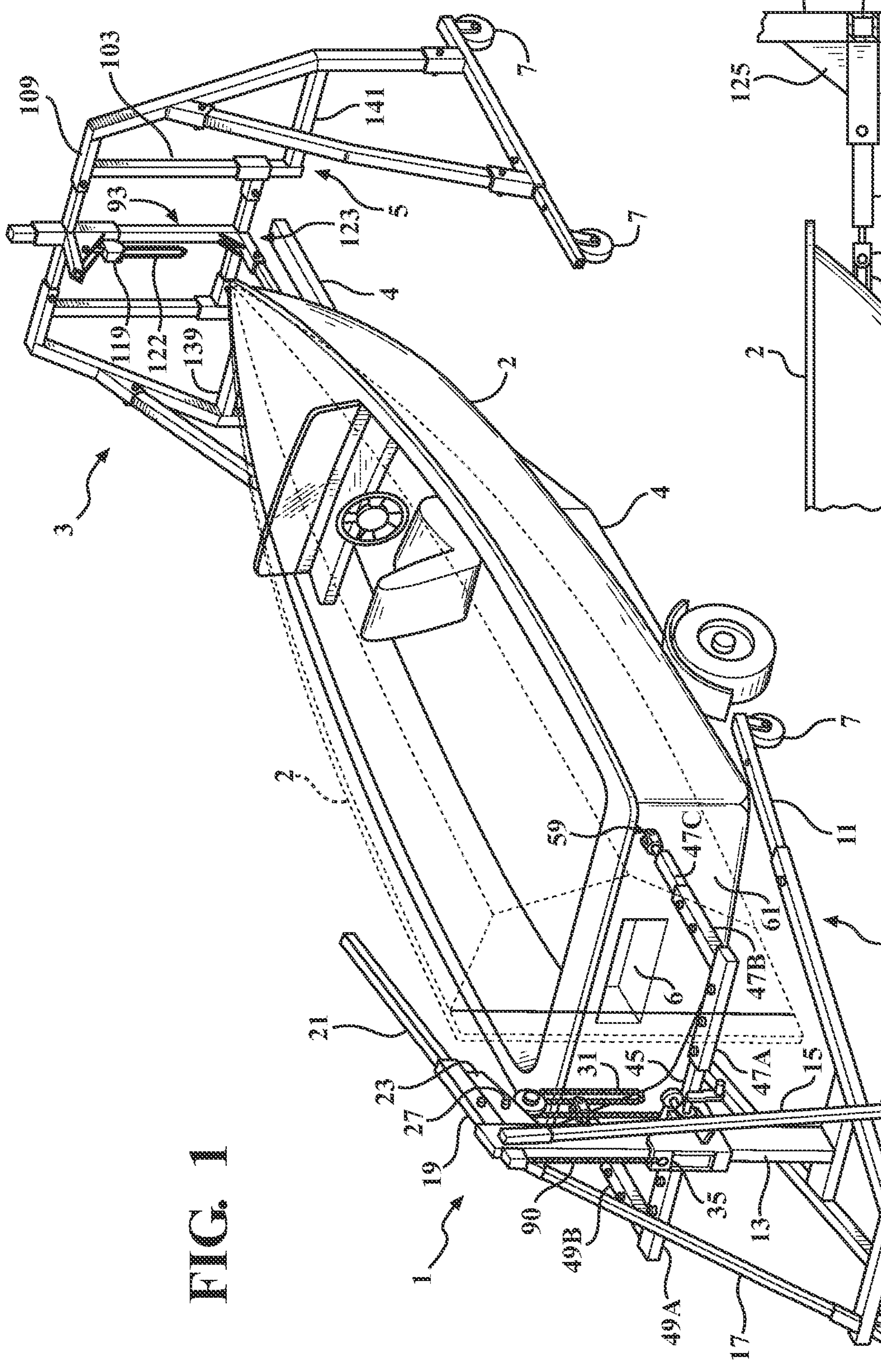
FIG. 1 is a perspective view of the new Boat Rotative Mount showing a typical boat being connected to and supported by the front and rear support frames thereof.

As shown in FIG. 1, a boat rotative mount generally includes a rear end and front end support member or frame, 1 and 3 respectively, which are designed to support and hoist a boat 2 for rotation thereof solely by the support eyes of the boat. U.S. Pat. No. 5,051,056 issued to the assignee of the instant application on Sep. 24, 1991, entitled Portable Boat Jacking and Rotating Apparatus, describes such in detail and the contents of which is hereby expressly incorporated herein by reference.

The support frames 1 and 3 are specifically designed so that they may be properly positioned for connection to a boat 2 without removing the boat from a boat trailer 4. Moreover, the front support frame 3 is designed such that an archway path 5 is formed thereby so that the boat trailer 4 may be removed once the boat 2 is supported and hoisted from the same.

The boat 2 shown in FIG. 1 is for illustrative purposes only. In order to simplify and avoid cluttering the drawings with unnecessary details, the boat 2 is shown devoid of an engine or lower drive unit. It should be understood, however, that the Portable Boat Rotative Mount is specially designed to accommodate a wide variety of types of boats such as inboards, inboards/outboards and outboards. The boat 2 is shown with a rear opening 6 to signify that generally a lower drive unit would extend outwardly therefrom, as in the case of an inboard/outboard. The important point is that the boat 2 be equipped with a pair of rear support eyes 59 connected to the transom 61 of the boat 2, and a similar front-end support eye 159, to facilitate connection to the respective rear and front support frames 1 and 3.

Each support frame 1 and 3 is transportable and movable via wheels 7 which are mounted on the base portions thereof. As shown in FIG. 1, the A-frame base member 9 of the rear support frame 1 has extensible leg portions 11 which are adjustable so as to accommodate and help balance varying sizes and shapes of boats. Although not shown in the drawings, it is conceivable that the front support frame 3 may also be designed with an adjustable or extensible base frame. Through the use of the improved boat rotative mount, many different types and sizes of boats may be supported and rotated at least 180 degrees in either direction about their longitudinal axis for ease of access to both the exterior and interior thereof when cleaning or repairing same.

Figure 2:
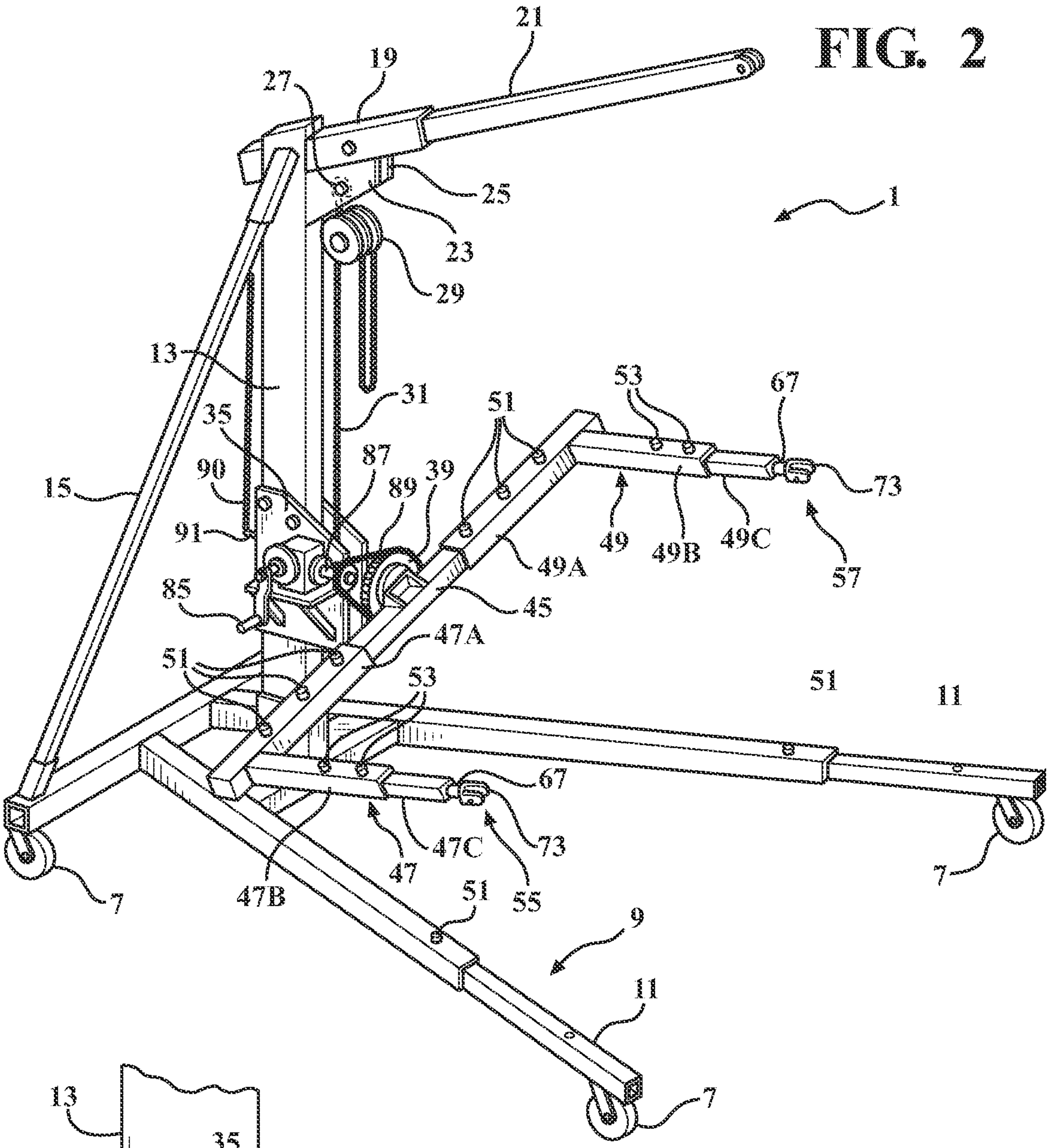
FIG. 2 is a perspective view of the rear support frame of the new Boat Rotative Mount showing the rotatable connecting arms which support and rotate a boat connected thereto.

As best shown in FIG. 1 and FIG. 2, the rear support frame 1 is comprised of a movable and adjustable A-frame base 9 which supports an upstanding mast 13. For added strength, mast 13 is supported at its upper end to the base frame 9 by struts 15 and 17 which are securely connected therebetween. The top end of mast 13 carries a boom sleeve 19 which extends outwardly and upwardly from the mast 13 in a direction toward the boat 2 to be supported thereby. Boom sleeve 19 is designed to accommodate a removable boom 21 which extends over the rear portion of the boat so that an operator thereof may use the boom 21 to lift such heavy objects as boat engines, etc. The boom sleeve 19 is supported on its underside to the mast 13 by a pair of support plates 23 and 25. Extending transversely between and through support plates 23 and 25 is mounting pin 27 which functions as a mount for chain hoist 29.

Figure 2A:
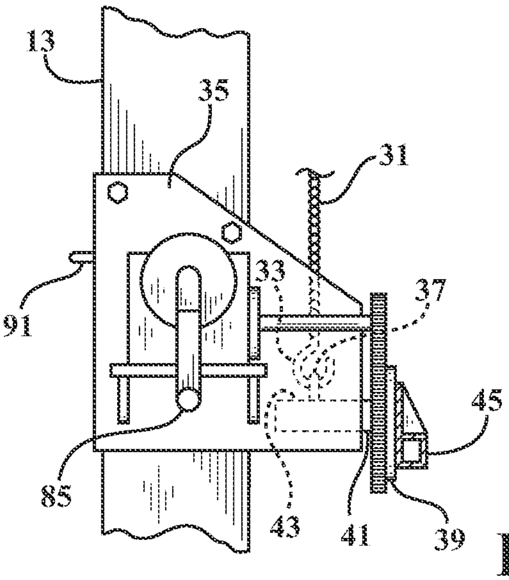
FIG. 2A is a fragmentary side elevation of the rear support frame of the new Boat Rotative Mount showing the vertically adjustable sleeve which carries the rotatable connecting arms of the frame.

As shown best in FIG. 2A, chain 31 extending downwardly from chain hoist 29 has a hook 33 which connects to sleeve 35 through connecting eye 37 which is integrally formed with sleeve 35. Sleeve 35 is slidably mounted upon mast 13 for vertical movement thereon, such vertical movement being controlled by chain hoist 29 and chain 31. Through the use of chain hoist 29, sleeve 35 can be raised and lowered with relative ease, thereby raising and lowering the rear end of a boat 2 supported thereby.

Mounted on sleeve 35 and carried in rotatable rotation thereto is gear plate 39 with shaft 41 which is carried in cooperative rotatable relation within central opening 43 in sleeve 35. Gear plate 39 is disposed in a transverse plane relative to the longitudinal axis of the boat 2 to be supported and rotated thereby, thereby facilitating rotation about the boat's longitudinal axis. Fixedly mounted upon the front face of gear plate 39 is mounting bar 45 which carries a pair of connecting arms 47 and 49.

Connecting arms 47 and 49 include tubular sleeves 47A and 49A which mount on opposite ends of mounting bar 45 and can be locked thereto via locking bolts 51. Connected to sleeve 47A and extending outwardly therefrom toward the boat 2 to be supported thereby is a second sleeve member 47B which slidably carries in telescoping relation an extensible portion 47C therewithin. The extensible portion 47C can similarly be locked into its desired position via locking bolts 53. Because connecting arms 47 and 49 are similarly constructed, a second sleeve 49B having an extensible portion 49C are also fixedly connected to sleeve 49A and extend outwardly therefrom toward the boat 2 to be supported thereby.

Connecting arms 47 and 49 can be alternatively constructed with an upward 90 DEG bend therein (not shown), such that the arms will be essentially z-shaped. This configuration of the connecting arms will lower the axis of pivot relative to the boat, which is sometimes beneficial, particularly when boats having a lower center of gravity are being hoisted and rotated.

Each connecting arm 47 and 49 have rotatable mounting heads 55 and 57 which are rotatably carried by extensible portions 47C and 49C, respectively. Rotatable heads 55 and 57 function to connect to the rear support eyes or eye bolts 59 which extend outwardly from and are connected to the transom 61 of the boat.

The specific construction of extensible portions 47C and 49C, and rotatable heads 55 and 57 are best shown in FIGS. 4 and 4A. For illustrative purposes, connecting arm 47 is shown in FIGS. 4 and 4A. It should be understood, however, that connecting arm 49 is constructed in a similar manner. As can be seen in the drawings, tubular sleeve members 47A and 47B are square in cross section, but it is conceivable that other cross-sectional configurations could also be used. Extensible portion 47C is constructed with outer dimensions which cooperate with the inner dimensions of tubular sleeve 47B, such that extensible portion 47C is telescopically slidable and insertable within tubular sleeve 47B.

The outer end of extensible portion 47C has a radially inwardly extending shoulder 63 which forms a central circular opening 65 therethrough. Central opening 65 is constructed to cooperatively receive in rotatable relation therein shaft 67 of rotatable head 55. Shaft 67 has a cap 69 fixedly secured to its inner end, said cap 69 having diametrical dimensions which are greater than the diameter of opening 65. As such, cap 69 rests upon shoulder 63 and prevents head 55 from being pulled out of extensible portion 47C. To further prevent longitudinal movement of rotatable head 55 along the axis of extensible portion 47C, a metal strap 71 extends over cap 69 and is welded to shoulder 63 of extensible portions 47C. The use of strap 71 prevents longitudinal movement of head 55 but freely allows head 55 to rotate within central opening 65.

Rotatable head 55 has at its outer end a U-bracket 73 which is constructed for connection to a support eye 59 of a boat. The U-bracket 73 has a pair of longitudinally extending opposed spaced arms 73A and 73B, each of which has a transverse opening 75 extending therethrough for accommodation of a mounting bolt and nut 77 and 79, respectively.

As can be readily seen from FIG. 4, for connection of the rotatable head 55 to one of the support eyes 59 of the boat, the support eye 59 is inserted between opposite arms 73A and 73B so that the opening through the support eye 59 is in cooperative alignment with opening 75 through said arm 73A and 73B. For added support and to disperse the weight of the boat over a larger surface area on the transom 61 of the boat, L-shaped brackets 81 are preferably used in conjunction with rotatable head 55 to securely connect the respective connecting arm to the support eye 59 of the boat. Each L-shaped bracket 81 also has an opening which is disposed in cooperative alignment so as to be capable of receiving bolt 77 therethrough. Once the opening through arm 73A and 73B, brackets 81 and the support eye 59 are in proper alignment, bolt 77 can be inserted therethrough and receive nut 79 on the opposite end thereof so as to fixedly secure the respective connecting arm to the boat.

Figure 5:
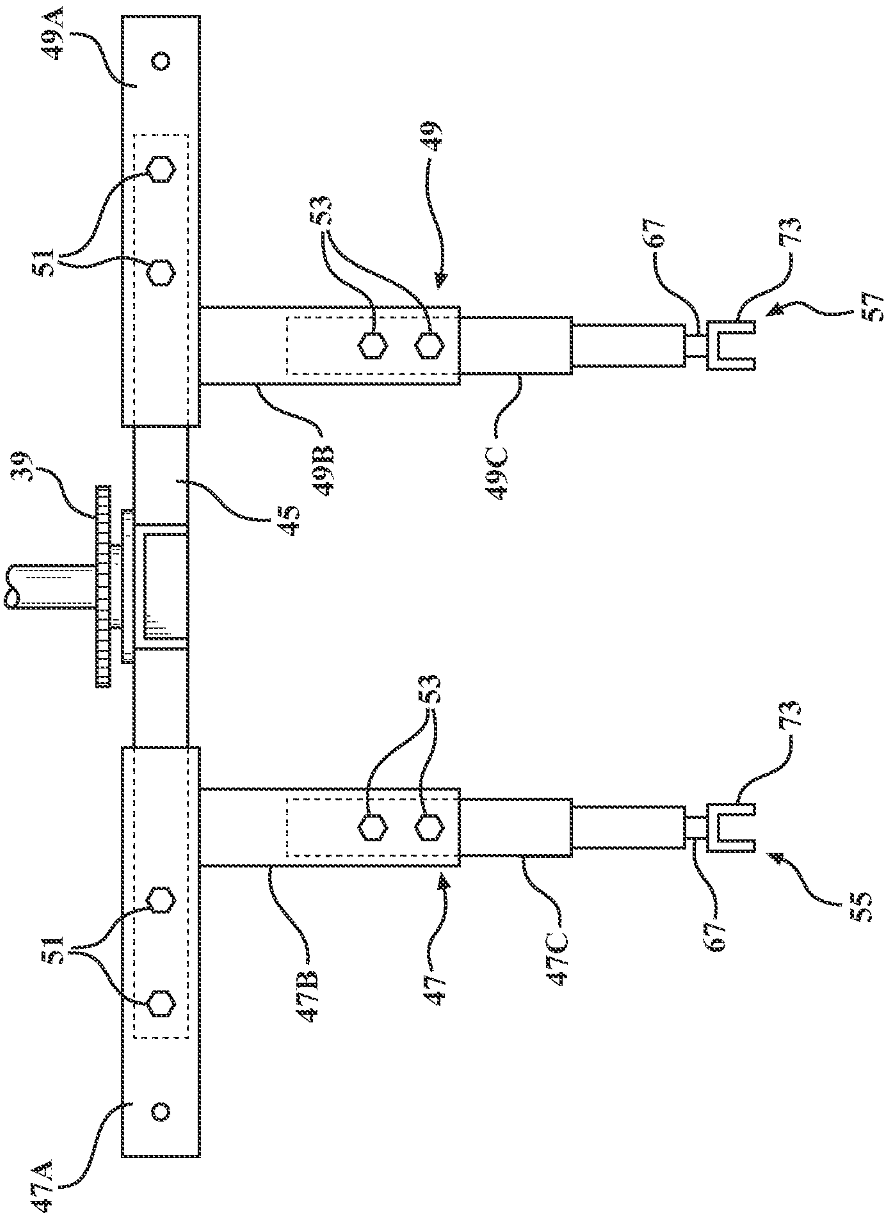
FIG. 5 is a top plan view of the rear connecting arms of our boat rotative mount, showing the reversibility thereof.

The rotational movement of head 55 allows the operator who is connecting a boat thereto to rotate head 55 into the proper position so that the support eye 59 of the boat can be easily inserted between the opposed arms of U-bracket 73, regardless of how the eye support 59 is mounted upon the transom 61 of the boat. It should also be noted, as is readily apparent from FIG. 5 of the drawings, that tubular sleeves 47A and 49A may easily be flipped over end to end about a transverse axis and reversibly mounted upon their respective ends of mounting bar 45, thereby making it possible to utilize such connecting arms with a variety of boat sizes having various widths.

Rotation of the mounting bar 45 and consequently the connecting arms 47 and 49 is affected through gear plate 39, which is rotatably mounted on vertically movable sleeve 35. Also mounted on sleeve 35 is a lockable manual gear crank mechanism 85 which rotatably controls pinion 87. Pinion 87 subsequently causes rotation of gear plate 39 through chain 89 which extends around both pinion 87 and gear plate 39 in controlling relation thereto. Thus, turning crank 85 can cause a rotation of mounting bar 45 and consequently connecting arms 47 and 49 in either direction about the longitudinal axis of the boat 2 carried thereby, up to at least 180 degrees. As gear crank 85 controls the rotation of pinion 87, and consequently gear plate 39 and connecting arms 47 and 49, locking the gear crank 85 causes the connecting arms 47 and 49 to lock in any desired position.

The rear support frame 1 also includes a safety chain 90 which is fixedly connected at one end to the top of mast 13 and can be adjustably connected elsewhere along the chain to slidable sleeve 35. Once the sleeve 35 is properly positioned via chain hoist 29, safety chain 90 can be pulled taut and secured to catch 91 which is mounted upon the backside of sleeve 35.

Figure 3:
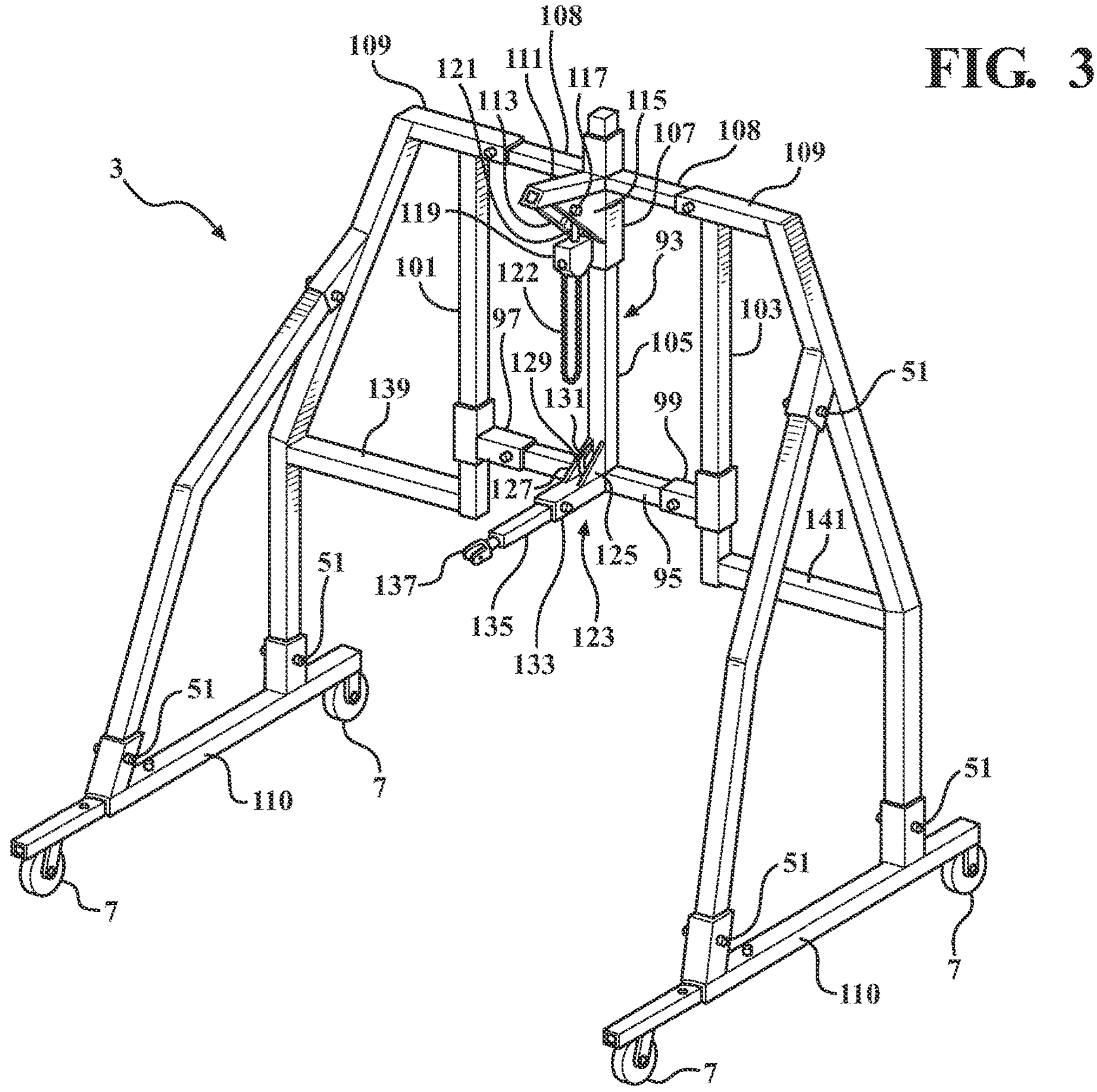
FIG. 3 is a perspective view of the front support frame of the new Boat Rotative Mount.

Turning now to the front support frame, as best shown in FIGS. 1 and 3, the front support frame 3 includes a slidably adjustable T-bar 93 which is centrally disposed and vertically movable upon frame 3. The cross-bar portion 95 of slidable T-bar 93 carries brackets 97 and 99 which slidably engage vertical support studs 101 and 103, respectively, of frame 3. Leg 105 of T-bar 93 extends upwardly from cross bar 95 through sleeve 107. Sleeve 107 has arms 108 which telescopically engage in lockable relation to top support bars 109 of frame 3. The slidable engagement of brackets 97 and 99, and the slidable relation of leg 105 within sleeve 107 allows free vertical movement and adjustment of T-bar 93. Frame 3 includes a pair of extensible base members 110 which can be adjusted and locked at various lengths to provide increased support and balance, if needed. Each extensible base member 110 includes a pair of wheels 7 to provide transportability to the support frame 3.

Mounted on sleeve 107 is a second boom sleeve 111 which extends upwardly and outwardly toward the boat 2 to be supported by frame 3. Boom sleeve 111 is supported by a pair of support plates 113 and 115 which are also fixedly connected to sleeve 107. Similar to the rear support frame 1, a mounting pin 117 extends transversely across and through support plates 113 and 115, and functions as a mount for the front chain hoist 119 via hook 121.

Chain 122 is carried by front chain hoist 119 and extends downwardly therefrom to bracket 123 which is mounted on T-bar 93 at the junction between cross bar 95 and leg 105. Bracket 123 also has a pair of spaced support plates 125 and 127 with a mounting pin 129 extending thereacross and therethrough so as to provide a catch for hook 131 which is connected to the bottom of chain 122. With chain 122 connected to bracket 123, the vertical movement of T-bar 93 can be controlled through front chain hoist 119. Similar to the rear support frame 1, the front support frame 3 includes a pair of safety chains (not shown), each of which is connected at one end to one of the top support bars 109 and adjustably connected at its other end to one of the slidable brackets 97 or 99.

Figure 1A:
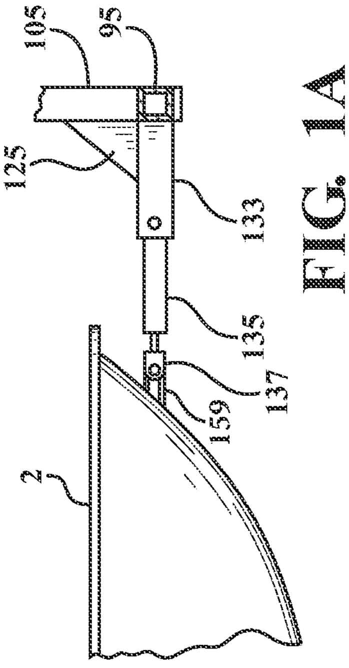
FIG. 1A is fragmentary side elevation of the front end of a boat which is connected to the front support frame of the new Boat Rotative Mount.

As best shown in FIGS. 1A and 3, bracket 123 includes a tubular sleeve portion 133 which functions in a similar manner to sleeve 47B and 49B of the rear connecting arms 47 and 49. Tubular sleeve portion 133 is designed to slidably receive in lockable telescoping relation an extensible front connecting arm 135 with a rotatable head 137, the construction and operation of which is identical to rear connecting arms 47 and 49. The rotatable head 137 of the extensible front connecting arm 135 connects to the front-end support eye 159 of the boat in a similar manner to that described previously with respect to rotatable heads 55 on rear connecting arms 47 and 49.

Vertical support studs 101 and 103 extend downwardly from respective top support bars 109 to a point approximately mid-way between ground level and top support bars 109. The bottom ends of vertical support studs 101 and 103 connect to a pair of mid-section cross bars 139 and 141, respectively, of frame 3. Mid-section cross bars 139 and 141 add further support to frame 3 and also act as a stop for brackets 97 and 99 so as to prevent the same from becoming disengaged from vertical support studs 101 and 103.

The front support frame 3 is specifically designed in the manner described above with the intention of providing a passageway or archway through the midportion thereof so as to be capable of accommodating a boat trailer 4 therethrough and thereunder. As best shown in FIG. 1, the front support frame can be transported and moved into its proper position for connection to the boat without having to remove the boat 2 from the boat trailer 4. Once the boat 2 is connected at both ends to the rear support frame 1, and to the front support frame 3, the boat may be hoisted directly from the trailer via chain hoists 29 and 119. The boat trailer may then be driven or pulled out from beneath the boat straight through the passageway defined by the front support frame 3. This is particularly advantageous when the boat being hoisted and rotated by the improved boat rotative mount is of substantial weight.

Figure 3A:
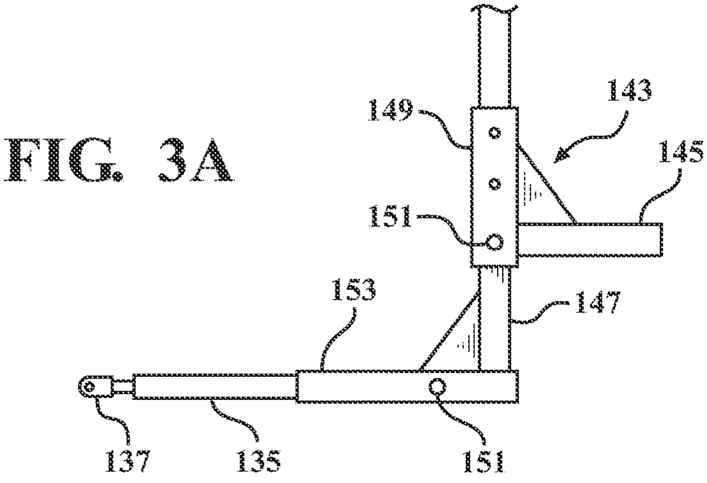
FIG. 3A is a side elevation of an alternative front-end connecting arm which is adapted for use with the front support frame of the new Boat Rotative Mount.

As shown in FIG. 3A, an alternative adjustable link 143 may be used to accommodate smaller boats and boat trailers which ride lower to the ground, consequently lowering the relative position of the boat's front-end support eye 159 relative to frame 3. Alternative adjustable link 143 has an insertable bracket 145 which replaces extensible front connecting arm 135 and is telescopically insertable in lockable relation within tubular sleeve portion 133 of bracket 123. Insertable bracket 145 slidably carries a vertically adjustable member 147 within sleeve 149. Vertically adjustable member 147 may be locked in any desired position via locking bolts 151. On the bottom end of vertically adjustable member 147 is connected another tubular sleeve 153 which is horizontally disposed and has similar dimensions as tubular sleeve portion 133 of bracket 123 which is connected to T-bar 93. Tubular sleeve 153 extends outwardly toward the boat and is constructed to receive telescopically therewithin extensible front connecting arm 135. Extensible front connecting arm 135 may be locked in any desired position via a similar locking bolt 151 on tubular sleeve 153. It can readily be seen from FIG. 3A that the alternative adjustable link 143 is adjustable both horizontally and vertically to further accommodate a wide variety of boat sizes.

Figure 3B:
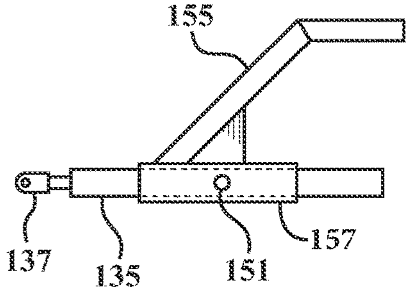
FIG. 3B is a side elevation of another alternative construction of the front-end connecting arm which is adopted for use with the front support frame of the new Boat Rotative Mount.

Shown in FIG. 3B is another alternative front end adjustable link, similar to that shown in FIG. 3A. In this embodiment, the adjustable link has an angularly depending connecting arm 155 which is designed to be telescopically insertable and lockable within bracket 123 on the front support frame 3. Preferably, the angularly depending portion of connecting arm 155 extends downwardly from the horizontal at approximately 45 DEG.

Connected to the lower end of angularly depending connecting arm 155 is a sleeve 157 into which extensible front connecting arm 135 with rotatable head 137 may be received telescopically. Extensible front connecting arm 135 may be adjusted within sleeve 157 and locked into its desired position via a similar locking bolt 151.

From the above description, it is readily apparent that once a boat 2 has been removed from the water and rests upon its boat trailer 4, the rear and front support frames 1 and 3 of the improved boat rotative mount may be easily moved into proper position and adjusted accordingly so as to be readily capable of connecting the respective connecting arms to the support eyes of the boat. The support frames 1 and 3 may be properly positioned without removal of the boat from the boat trailer. Once the connecting arms are connected to the support eyes of the boat 2, the boat 2 may be hoisted from the boat trailer 4 and the boat trailer 4 may be removed by simply pulling the same through a passageway 5 defined by the front support frame 3. Once the boat trailer 4 has been removed, through the use of crank 85, the boat may be rotated about its longitudinal axis in either direction at least 180 degrees. Both the exterior and interior of the boat 2 are readily accessible through the use of the boat rotative mount, because the boat is supported solely by the support eyes thereof.

Each support frame 1 and 3 is capable of being readily broken down and reassembled as desired. Each frame 1 and 3 is generally comprised of a plurality of bracket or sleeve-type members, with insertable portions extending therefrom to complete the construction thereof. Each frame can be disassembled into smaller and easier to handle components, and can be re-assembled and locked together via locking bolts which are shown in a plurality of positions in the accompanying drawings.

Figure 6:
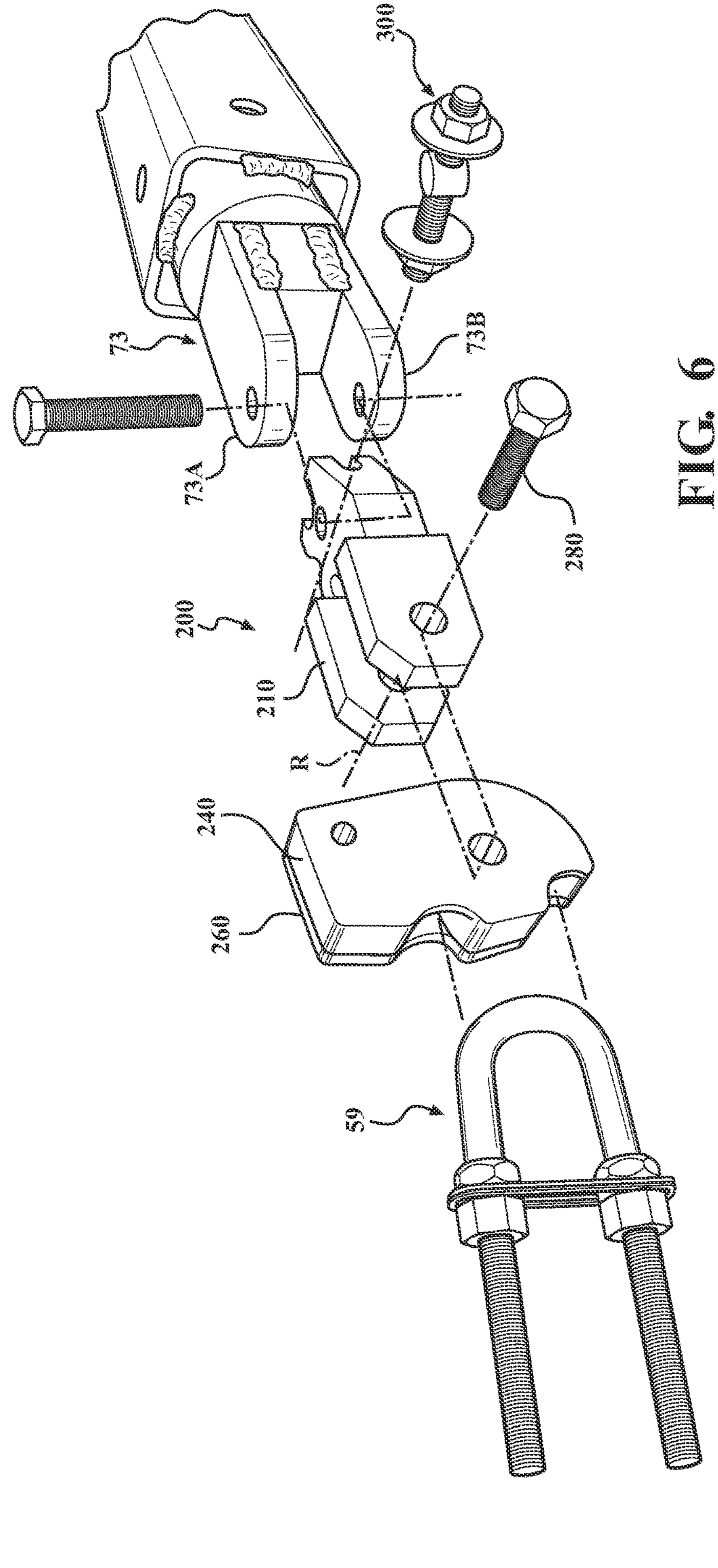
FIG. 6 is an exploded view of an articulatable support eye capture knuckle assembly according to one disclosed non-limiting embodiment.
Figure 7:
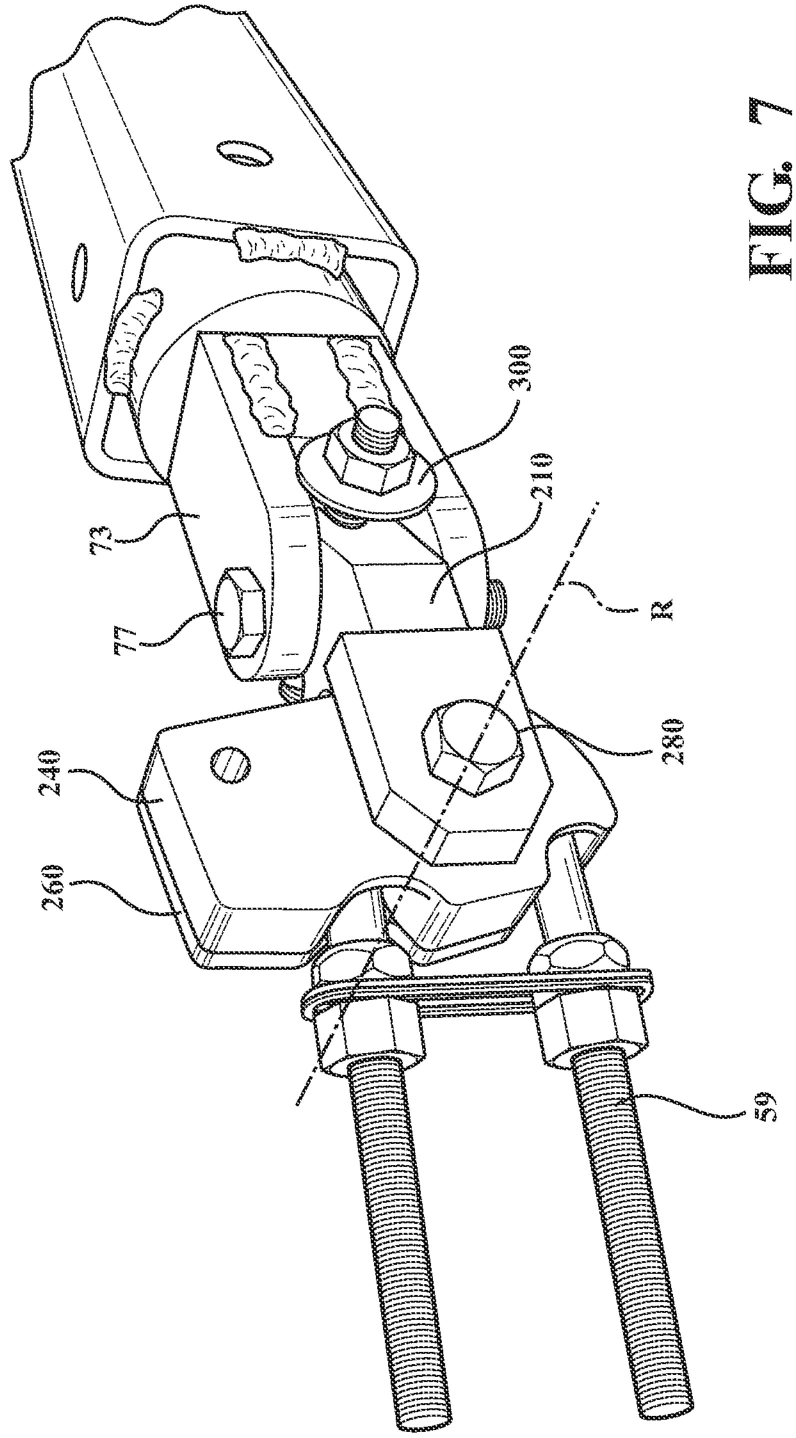
FIG. 7 is a perspective view of the articulatable support eye capture knuckle assembly of FIG. 6.

With reference to FIGS. 6 and 7, rather than mounting the U-bracket 73 directly to the support eye 59 such as shown in the embodiment of FIG. 4, an articulatable support eye capture knuckle assembly 200 is mounted therebetween to provide significant heretofore unavailable articulation to facilitate a supportive interface with the support eye 59 arranged in various positions and orientations. Although described with respect to the U-bracket 73, any other U-bracket, and/or rotatable head 137 which essentially forms a clevis may alternatively utilize the articulatable support eye capture knuckle assembly 200 to capture and support the support eye 59.

Although disclosed with respect to a boat in one illustrated embodiment, it should be appreciated that the articulatable support eye capture knuckle assembly 200 may be used with anything that has one or more support eyes, rings, hooks, etc., to include but not be limited to land vehicles, air vehicles, sea vehicles, space vehicles, machinery, etc.

The articulatable support eye capture knuckle assembly 200 generally includes an attachment knuckle 210, a support eye retainer 240, a support eye retainer plate 260, a retainer fastener 280, and an adjustment assembly 300. The articulatable support eye capture knuckle assembly 200 may be used with the support frames 1 and 3 or any other U-shaped bracket and/or clevis to facilitate attachment to support eyes of various boats, vehicles, etc., which may be at various orientations. It should also be appreciated that although the term "support eye" is utilized throughout, the support eye retainer 240 and the support eye retainer plate 260 may be designed to interface with any such arcuate type component, such as lifting eyes, hooks, etc.

Figure 8:
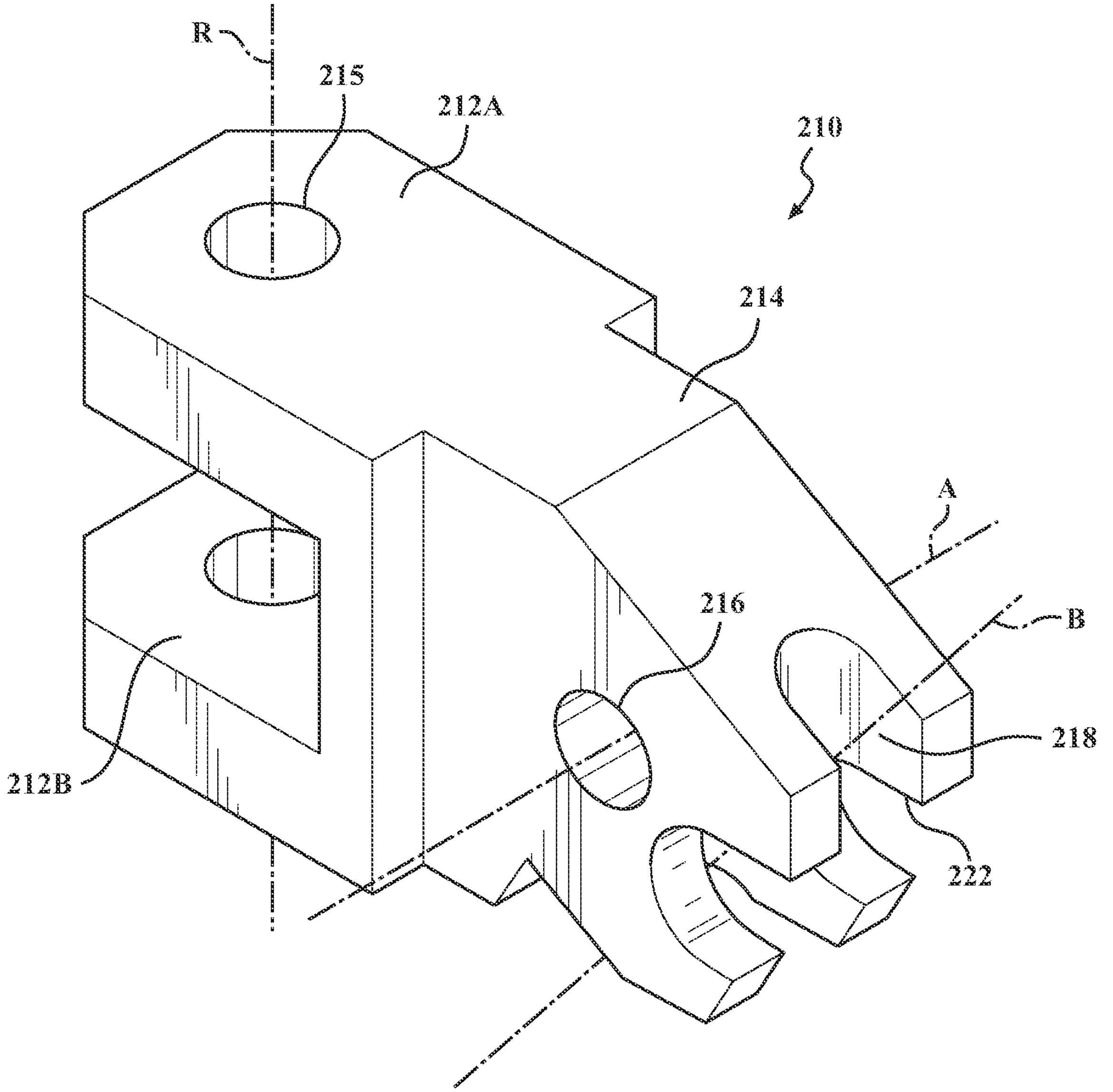
FIG. 8 is a perspective view of an attachment knuckle of the articulatable support eye capture knuckle assembly.

With reference, to FIG. 8, the attachment knuckle 210 includes a first arm 212A and a second arm 212B, the second arm 212B parallel to the first arm 212A. A retention aperture 215 is located in each of the first arm 212A and the second arm 212B along a retention axis R.

A web 214 is attached to the first arm 212A and the second arm 212B. The web 214 may be arranged perpendicular to the first arm 212A and the second arm 212B and include an attachment aperture 216 and an adjustment passage 218. The attachment knuckle 210 may be an integral machined component.

The attachment aperture 216 is located along an attachment axis A and the adjustment passage 218 is located along an adjustment axis B transverse to the attachment axis A. The adjustment axis B may be in the same plane as the retention axis R but angled thereto so as to not be parallel.

Figure 9:
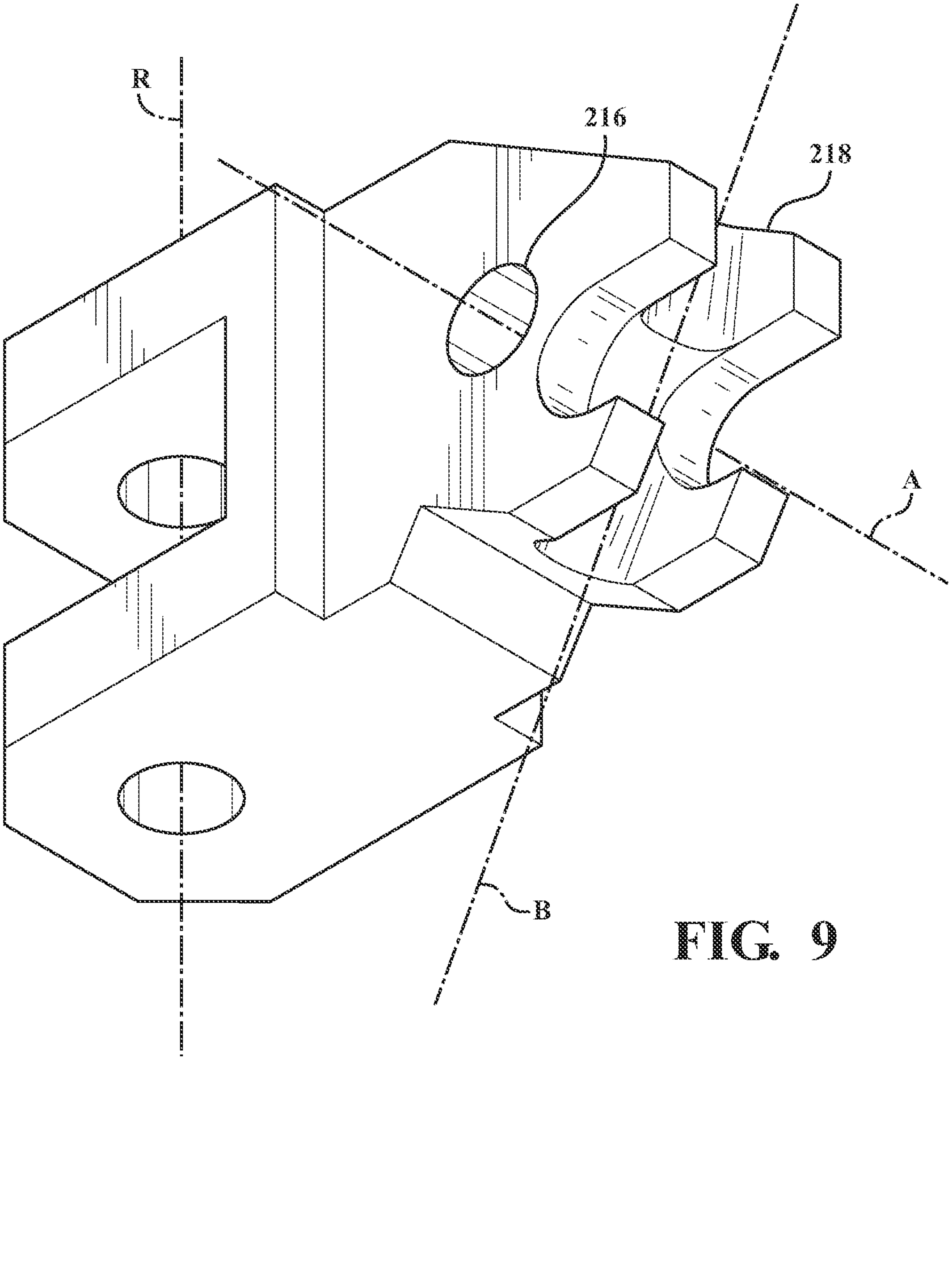
FIG. 9 is another perspective view of an attachment knuckle of the articulatable support eye capture knuckle assembly.

The adjustment passage 218 may be formed as an aperture or a slot along the adjustment axis B to receive the adjustment assembly 300. That is, the adjustment passage 218 may be formed through the web 214 such that the web 214 is transvers to the attachment aperture 216. The adjustment passage 218 includes a slot 222 that is located along the adjustment axis B to be intersected thereby. The slot 222 is parallel to the attachment axis A (also shown in FIGS. 9 and 10).

The web 214 is received within, in one example, the U-bracket 73 such that the attachment aperture 216 is aligned with the transverse opening 75 for accommodation of the mounting bolt and nut 77 and 79, respectively (FIG. 7). That is, the web 214 fits between the pair of longitudinally extending opposed spaced arms 73A and 73B rather than directedly receiving the support eye 59.

Figure 10:
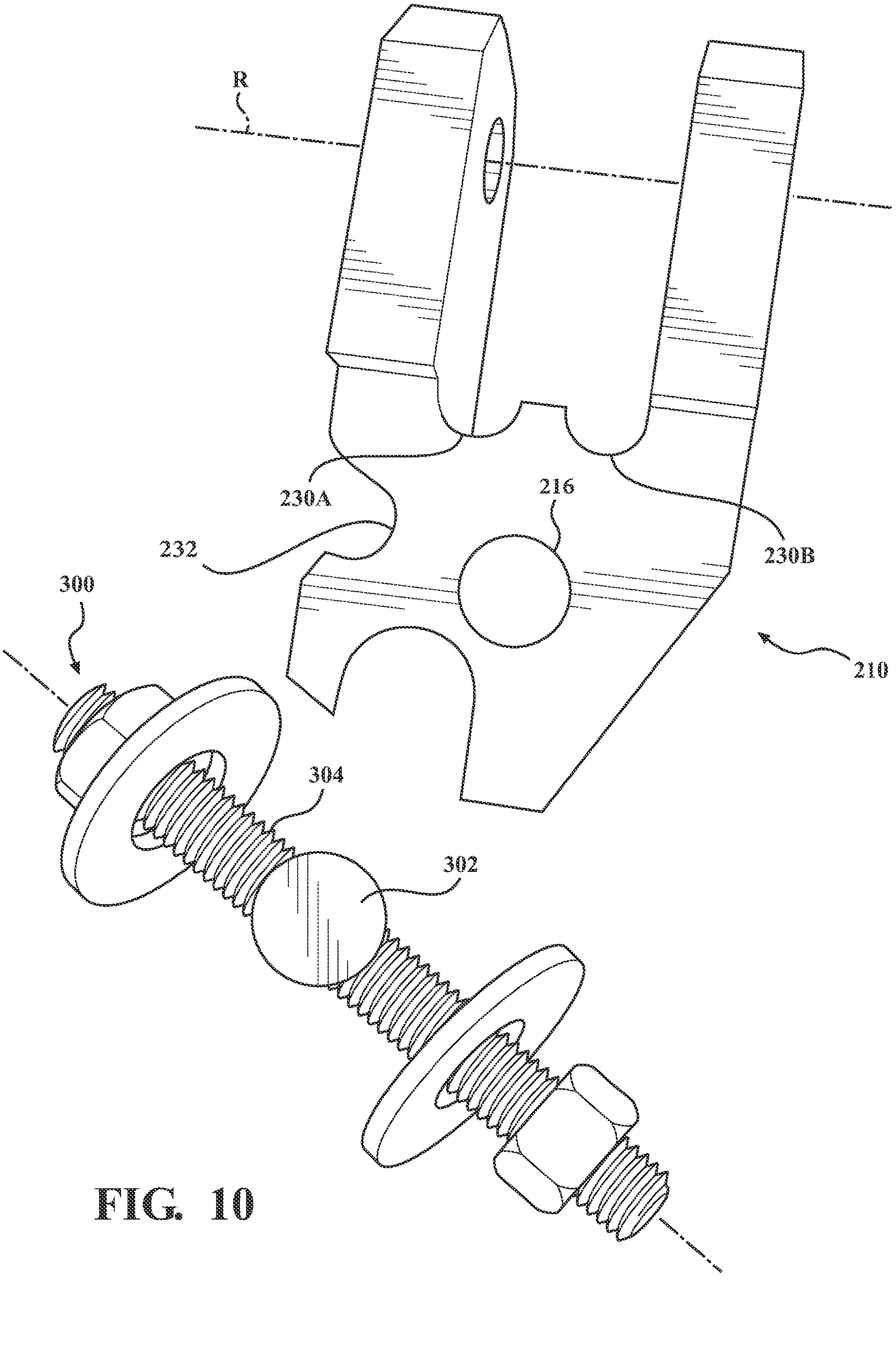
FIG. 10 is an exploded view of the attachment knuckle and adjustment assembly of the articulatable support eye capture knuckle assembly.

With reference to FIG. 10, the web 214 may include transverse recesses 230A, 230B to provide clearance for the support eye retainer 240 and the support eye retainer plate 260 when in an articulated position. The web 214 may also include a recess 230A, 230B and 232 to facilitate machining. In one example, the recesses 230A, 230B, 232 may be arcuate in shape to allow reduced cutting tool changeovers.

Figure 11:
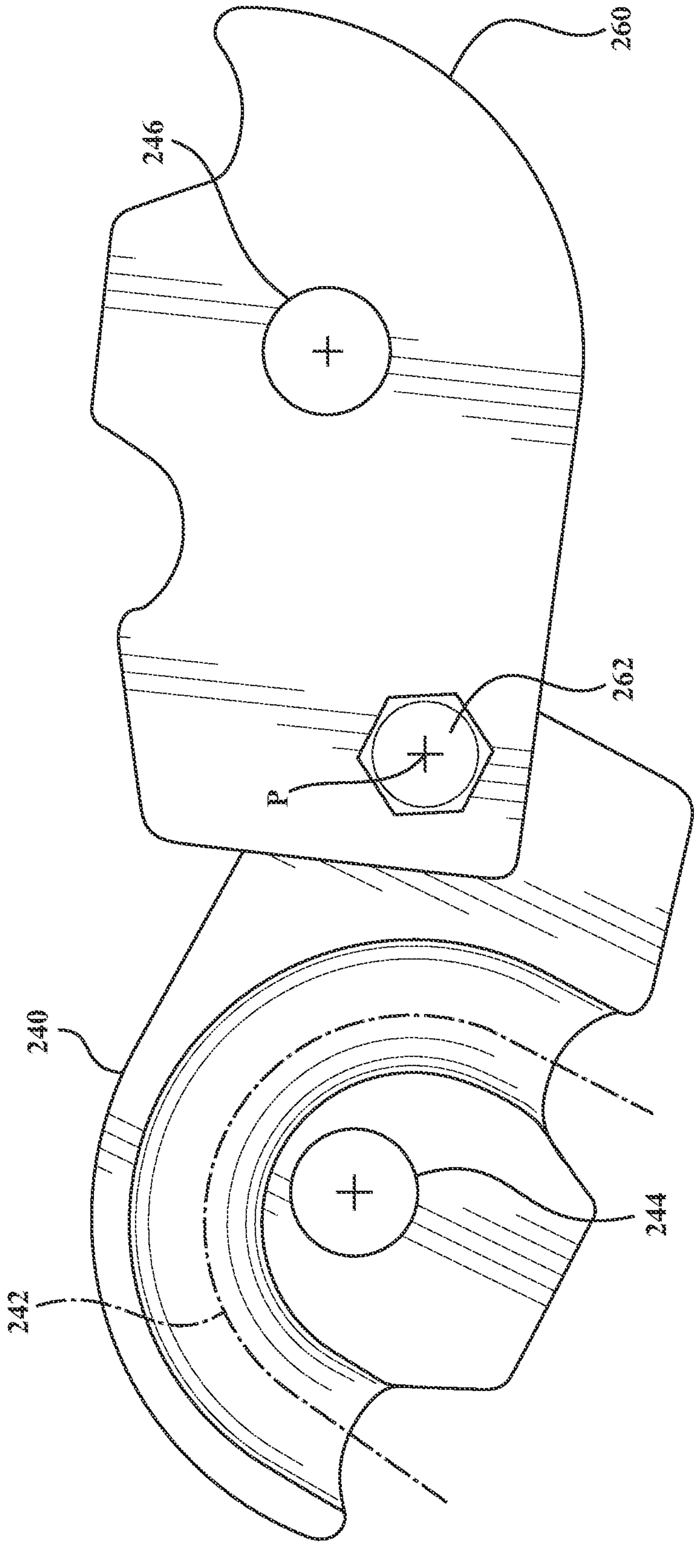
FIG. 11 is a plan view of a support eye retainer assembly of the articulatable support eye capture knuckle assembly.

With reference to FIG. 11, the support eye retainer 240 includes an arcuate channel 242 to receive a portion of the support eye 59. The arcuate channel 242 provides support for a significance surface area of the support eye 59. The arcuate channel 242 may be of any configuration to correspond with the corresponding component on that which is to be engaged and need not be specifically arcuate in shape.

The support eye retainer plate 260 may be fastened to the support eye retainer 240 by a pivot fastener 262 along a pivot axis P such that the support eye retainer plate 260 is pivotable about the pivot axis P. The pivot fastener 262 may be a bolt and nut or other fastener which may be removable or permanently attached to the support eye retainer plate 260 and the support eye retainer 240.

The support eye retainer plate 260 and the support eye retainer 240 form a support eye retainer assembly to at least partially enclose the arcuate channel 242 which allows the support eye 59 to be captured and supported therein. That is, a significant portion of the body of the support eye 59 is sandwiched therein and supported. The support eye retainer plate 260 and the support eye retainer 240 may be assembled first to the support eye prior to insertion of the support eye retainer assembly into the attachment knuckle 210. Various support eye retainer plates 260 may be provided to capture a specific sized support eye. In other words, the support eye retainer plate 260 may include an arcuate channel 242 specific to a particular support eye.

The retainer fastener 280 is mountable through the first arm 212A, the second arm 212B, a support eye retainer aperture 244, and a support eye retainer plate aperture 246 along the retention axis R to secure the support eye retainer plate 260 to the support eye retainer 240 between the first arm 212A and the second arm 212B and capture the support eye 59 therebetween (FIG. 6).

Figure 12:
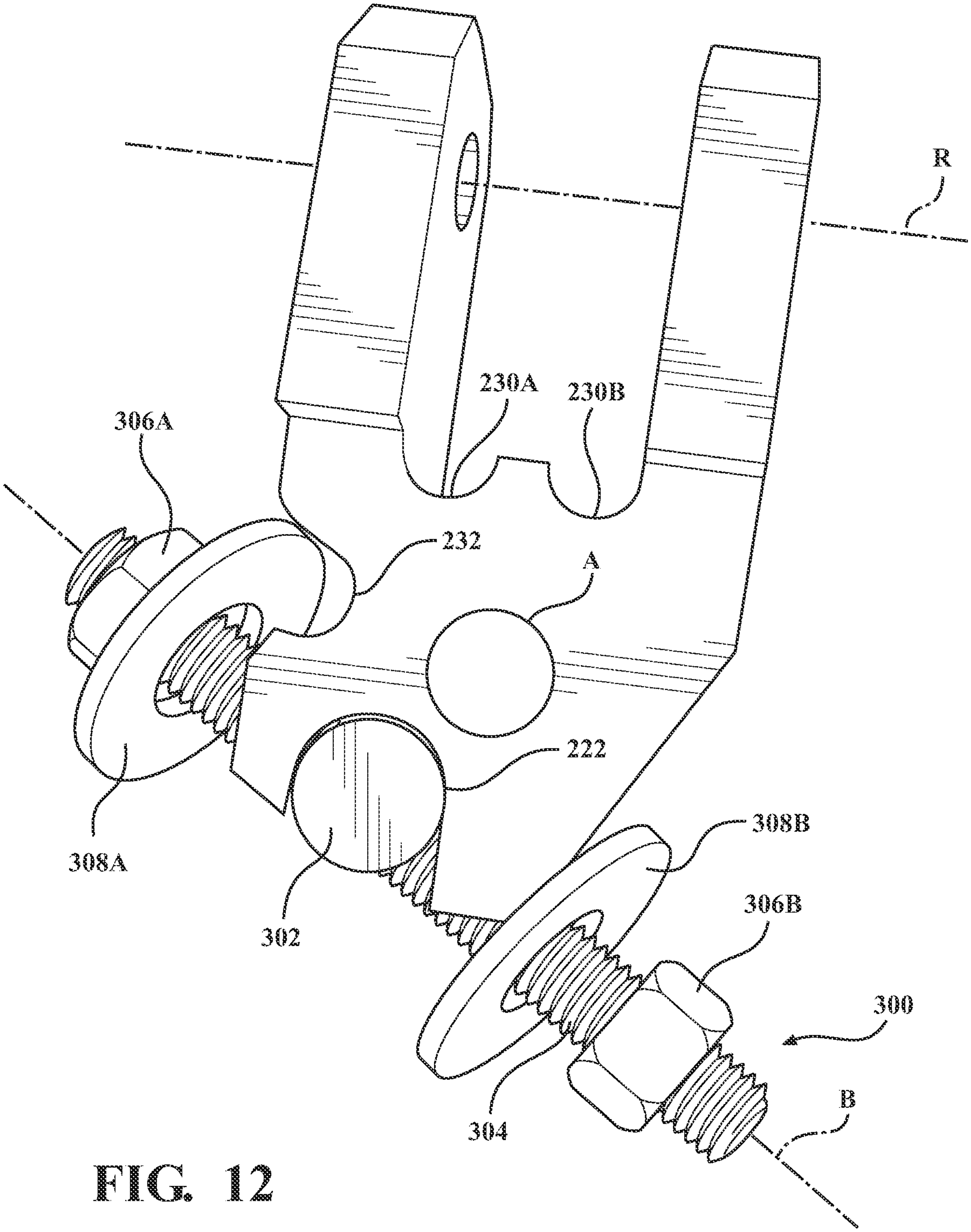
FIG. 12 is a plan view of the attachment knuckle and adjustment assembly.

With reference to FIG. 12, the adjustment assembly 300 is positioned along the adjustment axis B. The adjustment assembly 300 includes a threaded stud 302 that is positioned within the slot 222, a threaded rod 304 threaded through the threaded stud 302 along the adjustment axis B, a first nut 306A and a first washer 308A on a first end section of the threaded rod 304 and a second nut 306B and a second washer 308B on a second end section of the threaded rod 304.

Figure 13:
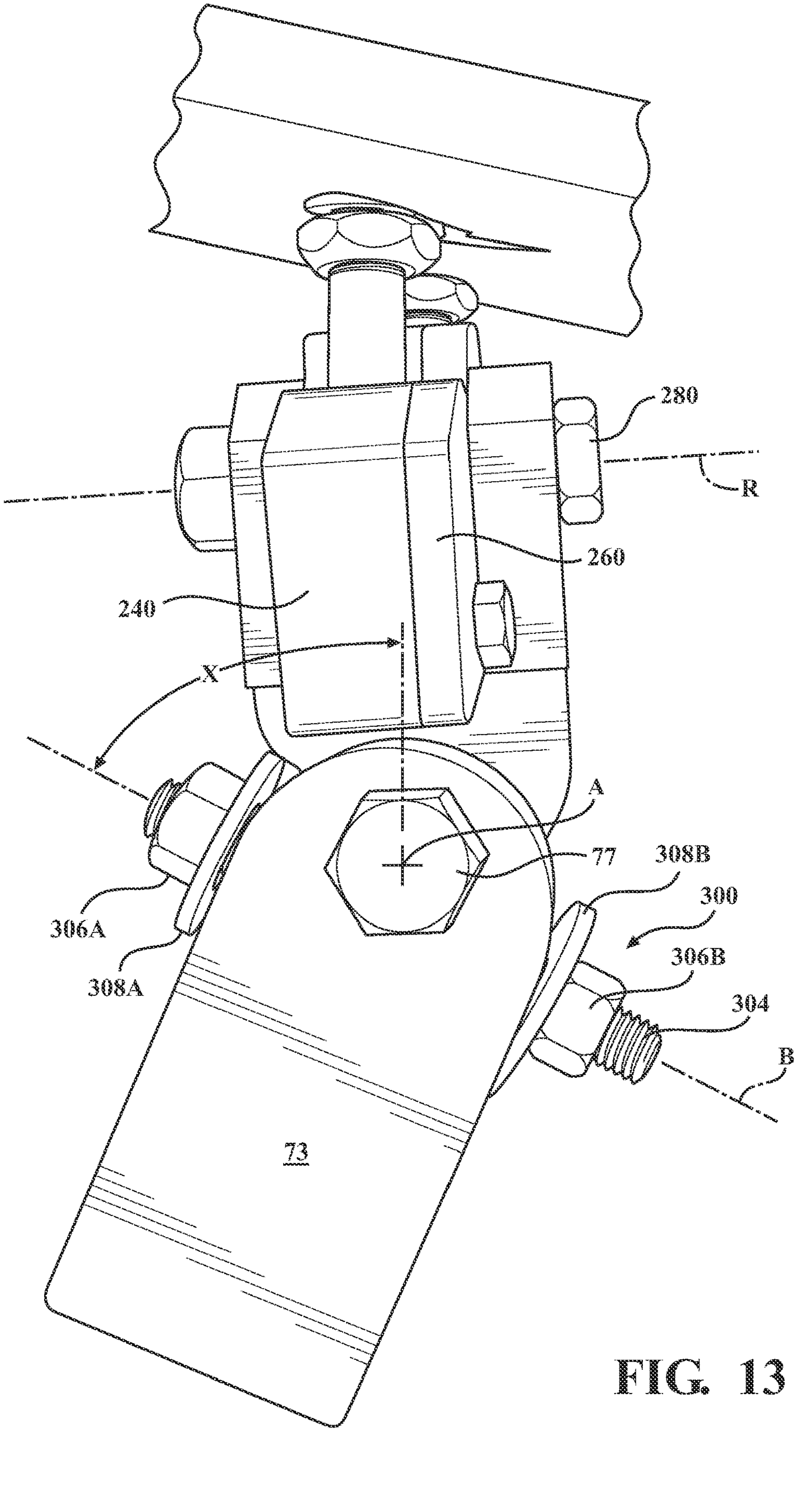
FIG. 13 is a perspective view of the articulatable support eye capture knuckle assembly of FIG. 6 in an example articulated position.

With reference to FIG. 13, the first nut 306A and the first washer 308A and the second nut 306B and the second washer 308B are engaged with the pair of longitudinally extending opposed spaced arms 73A and 73B of the U-bracket 73. Threaded axial adjustment of the threaded rod 304 through the threaded stud 302 via the first nut 306A and the second nut 306B pivots the attachment knuckle 210 about the attachment axis A. That is, an angle X of the attachment knuckle 210 is readily adjusted with respect to the U-bracket 73. A solid yet articulatable joint is thereby formed.

The articulatable support eye capture knuckle assembly 200 allows one person to complete jobs that usually require two or more persons, repairs become more efficient and the safety of working conditions are increased.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. An articulatable support eye capture knuckle assembly for attachment to a support eye, comprising:

- an attachment knuckle with a first arm and a second arm, the second arm parallel to the first arm, a retention aperture in the first arm and the second arm along a retention axis, an attachment aperture along an attachment axis and an adjustment passage along an adjustment axis transverse to the attachment axis;
- a support eye retainer with an arcuate channel to receive a portion of a support eye;
- a support eye retainer plate mountable to the support eye retainer along a pivot axis, the support eye retainer plate pivotable about the pivot axis to at least partially enclose the arcuate channel; and
- a fastener mounted through a support eye retainer aperture and a support eye retainer plate aperture along the retention axis to secure the support eye retainer plate to the support eye retainer between the first arm and the second arm.

2. The assembly as recited in claim 1, further comprising a web attached to the first arm and the second arm, the attachment aperture and the adjustment passage though the web.

3. The assembly as recited in claim 2, further comprising a slot in the web, the slot parallel to the attachment aperture.

4. The assembly as recited in claim 3, wherein the adjustment passage intersects the slot.

5. The assembly as recited in claim 4, further comprising an adjustment assembly along the adjustment axis.

6. The assembly as recited in claim 5, wherein the adjustment assembly comprises a threaded stud within the slot, a threaded rod threaded through the threaded stud along the adjustment axis.

7. The assembly as recited in claim 6, further comprising a first nut and a first washer on a first end section of the threaded rod and a second nut and a second washer on a second end section of the threaded rod.

8. The assembly as recited in claim 7, wherein the first nut and the first washer and the second nut and the second washer are engaged with a first arm and a second arm of a U-bracket.

9. The assembly as recited in claim 8, wherein adjustment of the first nut and the first washer and the second nut and the second washer along the threaded rod adjusts an angle of the attachment knuckle with respect to the U-bracket.

10. An articulatable support eye capture knuckle assembly for attachment to a support eye, comprising:

an attachment knuckle with a first arm and a second arm, the second arm parallel to the first arm, a retention aperture in the first arm and the second arm along a retention axis, an attachment aperture along an attachment axis and an adjustment passage along an adjustment axis transverse to the attachment axis, a slot in a web attached to the first arm and the second arm, the slot parallel to the attachment aperture, the adjustment passage along the adjustment axis intersects the slot;

a support eye retainer with an arcuate channel to receive a portion of a support eye;

a support eye retainer plate mountable to the support eye retainer to at least partially enclose the arcuate channel;

a fastener mounted through a support eye retainer aperture and a support eye retainer plate aperture along the retention axis to secure the support eye retainer plate to the support eye retainer between the first arm and the second arm; and an adjustment assembly along the adjustment axis, the adjustment assembly comprises a threaded stud within the slot, a threaded rod threaded through the threaded stud along the adjustment axis.

11. The assembly as recited in claim 10, further comprising a first nut and a first washer on a first end section of the threaded rod and a second nut and a second washer on a second end section of the threaded rod.

12. The assembly as recited in claim 11, wherein the first nut and the first washer and the second nut and the second washer are engaged with a first arm and a second arm of a U-bracket.

13. The assembly as recited in claim 12, wherein adjustment of the first nut and the first washer and the second nut and the second washer along the threaded rod adjusts an angle of the attachment knuckle with respect to the U-bracket.

* * * * *